US008958114B2

(12) United States Patent
Abello

(10) Patent No.: US 8,958,114 B2
(45) Date of Patent: Feb. 17, 2015

(54) PRINTING IMAGE SLICES IN PARALLEL BY PRINT ENGINES

(75) Inventor: Lluis Abello, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 2782 days.

(21) Appl. No.: 10/513,007

(22) PCT Filed: Apr. 28, 2003

(86) PCT No.: PCT/EP03/04414
§ 371 (c)(1),
(2), (4) Date: Jan. 27, 2006

(87) PCT Pub. No.: WO03/094502
PCT Pub. Date: Nov. 13, 2003

(65) Prior Publication Data
US 2006/0120787 A1    Jun. 8, 2006

(30) Foreign Application Priority Data

Apr. 27, 2002    (GB) .................................. 0209722.8

(51) Int. Cl.
| G06K 15/00 | (2006.01) |
| H04N 1/19 | (2006.01) |
| H04N 1/193 | (2006.01) |
| H04N 1/401 | (2006.01) |
| H04N 1/405 | (2006.01) |
| G06K 15/02 | (2006.01) |

(52) U.S. Cl.
CPC ........... *H04N 1/1903* (2013.01); *H04N 1/1934* (2013.01); *H04N 1/4015* (2013.01); *H04N 1/4052* (2013.01); *G06K 15/1857* (2013.01)
USPC ............ 358/1.18; 358/1.4; 358/1.5; 347/116; 347/117

(58) Field of Classification Search
USPC ............ 358/1.9, 1.4, 1.5, 1.8, 3.06, 3.3, 1.12, 358/1.17, 1.16, 1.18; 347/5, 16, 101, 117, 347/116
See application file for complete search history.

(56) References Cited

U.S. PATENT DOCUMENTS

| 4,955,065 A | 9/1990 | Ulichney ...................... 382/270 |
| 5,255,013 A | 10/1993 | Ng et al. ........................ 347/240 |
| 5,553,165 A | 9/1996 | Webb et al. ................... 382/250 |
| 5,771,105 A | 6/1998 | Rust et al. .................... 358/2.99 |
| 5,984,446 A * | 11/1999 | Silverbrook ...................... 347/3 |

(Continued)

FOREIGN PATENT DOCUMENTS

| EP | 0 295 105 A | 12/1988 |
| EP | 0 626 672 A | 11/1994 |

*Primary Examiner* — Jamares Q Washington
(74) *Attorney, Agent, or Firm* — Hewlett-Packard Patent Department

(57) ABSTRACT

A page-wide array inkjet printer allocates the processing tasks for individual printheads within the array to separate halftoning processors. Each halftoning processor processes the information relating to a strip of the image, with the boundaries between strips running parallel to the print medium advance direction. In a preferred embodiment, the pixels within each strip are processed using a forward error diffusion algorithm operating along columns of pixels parallel to the strip boundaries. The resulting halftone data is supplied from each halftoning processor to one or more uniquely associated printing component controllers, and these controllers generate print instructions for printing components (e.g. inkjet printheads) connected to the printing component controllers via a dedicated communications channel.

7 Claims, 11 Drawing Sheets

(56) References Cited

U.S. PATENT DOCUMENTS 6,000,776 A    12/1999  Suzuki et al. .................. 347/19
6,623,106 B2 *  9/2003  Silverbrook .................... 347/49
6,655,786 B1 * 12/2003  Foote et al. .................... 347/49

* cited by examiner

PRINTING IMAGE SLICES IN PARALLEL BY PRINT ENGINES

FIELD OF THE INVENTION

The present invention relates to the processing of images in printing systems to generate driving signals for image generation elements of the systems. The invention has a particular application in having a page wide array (PWA) of image generation elements.

BACKGROUND OF THE INVENTION

Image generation elements in printers can be as varied as inkjet nozzles, dot matrix elements, or LED arrays in laser printers. Such elements operate in response to driving signals which are generated in a printing pipeline which converts image data to signals which cause the image generation elements to reproduce the image on a medium with greater or lesser degrees of fidelity. (The medium may be a medium on which the image is directly printed (e.g. paper) or it may be an intermediate medium such as the photosensitive drum of a laser printer from which the final printing is carried out.)

A "printing pipeline" as defined herein is a collection of components or a succession of processes which operate on image data (such as, for example PostScript or Portable Document Format (PDF) files [both PostScript and PDF are Trade Marks of Adobe Systems], contone image data or halftone image data) to generate signals which are effective to directly or indirectly drive a number of image generation elements. Typically, the printing pipeline might include the components responsible for colour mapping an image file, linearising the image data, creating a halftone image from the linearised contone image, applying a print mask to the halftone image and outputting drive signals for driving the image generation elements (e.g. inkjet nozzles in an inkjet printhead) to reproduce the intended image. The printing pipeline is not limited to this specific collection of steps which is given as an example of the typical processes involved.

Conventional inkjet printers employ one or more printheads mounted on a carriage which is repeatedly scanned across a scan axis as the print medium is advanced stepwise past the scan axis. The printheads lay down swaths of ink during each scan, between advances of the print medium.

In a conventional high speed printer, each page of a print job is colour mapped (converted from a computer output format such as Postscript™ or Portable Document Format™ to a contone map of pixels) by a dedicated raster image processor (RIP).

The rasterised pages are buffered and then processed by an application specific integrated circuit (ASIC) which converts the bitmap into a halftone image composed of halftone data. The most basic colour printer will use combinations of cyan, magenta and yellow (CMY) to make the various colours, or for increased quality true black ink may be also available (CMYK). For high quality images, two additional inks, light cyan and light magenta are also employed to provide increased fidelity particularly with lighter tones such as skin tones (CcMmYK printing).

Each ink is conventionally printed by a separate printhead. The printheads are controlled by a printhead controller which analyses the halftone image data and specifies the nozzle firing sequence to cause the printheads to lay down ink at the correct point on the page, so that the printed image will be a more or less faithful reproduction of the original input image.

A continuing goal of inkjet printing technology is to improve printing speeds, which are limited by a number of factors including the time taken to scan across the page, which may be increased in multiples where multiple pass print modes are employed (in which each area of the printed image is covered by a multiple number of swaths to improve print quality).

One way of reducing print times is to employ a page wide array (PWA) of printheads. In PWA printers, an array of printheads extending across the width of the page is maintained in a static position during printing and the medium advances under the PWA, eliminating scanning times. As the number of printheads increases however, the processing requirements of the printer similarly increase.

In particular a bottleneck is likely to arise between the buffer in which the rasterised pages are stored and the ASIC which creates the halftone image, since the ASIC must operate in real time to supply the printhead controllers with the halftone image which they operate on to create the print mask for their own printheads.

A further problem which arises in PWA printers is related to the fact that arrays of image generation elements are unlikely in practice to operate identically across the array. In the case of inkjet printers, the nozzles are generally grouped in printheads which are each defined on a die or wafer. The dies are subject to manufacturing variations, and this can lead to variations in the volume of droplet ejected (which in turn affects image quality significantly).

Such problems are not limited to inkjet printers. A laser printer having an array of LEDs illuminating a photosensitive drum (such that the characteristics of the drum change affecting the adhesion of toner to the drum) will also suffer an analogous problem if the performance of the LEDs varies under the application of the same driving signals.

SUMMARY OF THE INVENTION

The invention provides a printing system comprising; a printing pipeline for processing image data to generate drive signals for driving image generating elements; and a plurality of groups of image generating elements, each group being characterised by an operational characteristic and being arranged to generate a separate portion of an image to be printed;

wherein at least part of the processing of image data is dependent on settings dependent upon said operational characteristic of the group for which the resultant drive signals are being generated; and wherein said part of the processing is applied to a first collection of data corresponding to a first of said image portions using first settings, prior to said part of the processing being applied to a second collection of data corresponding to a second of said image portions using second settings.

By ordering the processing of image data into data collections or blocks which correspond to portions of an image to be printed by the various groups of image generation elements, the processing can be improved. The necessary settings to compensate for varying operational characteristics of the group which is to print a portion of the image can be loaded into memory and used while that block of data is being processed. Then the settings appropriate to another group of image generation elements can be loaded and the block of image data for that portion of the image to be printed by that group can be loaded and used in processing.

An example of groups of image generating elements is printhead dies in which inkjet nozzles are formed. Between one die and another in the same printer, there can be significant variations (7% or more) in droplet volume which are not predictable in the same way and which result in different dies producing different intensities of colour, resulting in image banding.

Conventional processing of an image occurs row by row of pixels. If one wishes to compensate for variations in the operational characteristics of individual printhead dies across a row, the required settings must be adjusted multiple times across each row, which slows down the process.

In laser printers having an array of LEDs built up of modular sub-arrays, a similar variation can occur, since such sub-arrays may be manufactured independently of one another, and hence may have different responses to applied driving signals.

Preferably, the respective groups of image generating elements are each fixed in position in use to provide an image generation array whose width defines a printing area.

Such an array is preferably a page wide array of printing elements.

Preferably, said pipeline includes a raster image processor (RIP) for generating rasterised data from a print job received from an input of the printing system, and wherein said part of the processing is carried out in the RIP.

The pipeline can also include a linearisation processor for linearising image data to compensate for characteristics of the printing pipeline and/or image generating elements, and said part of the processing can be carried out in the linearisation processor.

In another embodiment, said pipeline includes a halftoning processor for halftoning image data, and wherein said part of the processing is carried out in the halftoning processor.

In a further alternative, said pipeline includes an image generation element controller for receiving halftone data and generating therefrom drive signals for driving said image generation elements, and wherein said part of the processing is carried out in the image generation element controller.

Preferably, said image generation elements are inkjet nozzles and said groups comprises a set of nozzles carried on one or more common dies.

Preferably, said groups are a set of nozzles from a plurality of dies, and said dies are arranged to print in co-operation with one another on the same portion of a medium.

Said nozzles may be adapted to print co-operating print masks in a single colour ink. Alternatively, said nozzles can be adapted to print a common portion of an image in different constituent ink colours.

A preferred operational characteristic, when said image generating elements are inkjet nozzles, is an average drop weight from a group of nozzles.

The invention further provides method of processing image data in a printing pipeline to generate drive signals for driving image generating elements, comprising the steps of:

receiving a first set of image data elements relating to a portion of an image to be printed by a first group of image generating elements, each group being characterised by an operational characteristic and being arranged to generate a separate portion of an image to be printed;

storing first settings dependent on said operational characteristic and processing said first set of image data elements dependent on said first settings;

receiving a second set of image data elements relating to a portion of an image to be printed by a second group of image generating elements, each group being characterised by an operational characteristic and being arranged to generate a separate portion of an image to be printed;

storing second settings dependent on said operational characteristic and processing said second set of image data elements dependent on said second settings.

The invention also provides a computer program comprising a set of instructions which when executed carry out the method described above comprising the steps of receiving a first set of image data elements, storing first settings, receiving a second set of image data elements, and storing second settings.

In another aspect the invention provides a printing system comprising a plurality of print engines each of which is adapted to print a different slice of an image, wherein the boundaries between slices are parallel to a print medium advance direction, and wherein each engine comprises:

a) a halftoning processor to operate on image data in a slice to be processed and to generate halftone data therefrom, and b) a print element controller for receiving halftone data from the halftoning processor and generating print element control instructions therefrom for communication to a set of print elements, wherein said halftoning processor processes the image slice by sequentially processing columns of image data elements, said columns lying along the print medium advance direction in the printed image By using different print engines to process and print different portions of a complete image, the processing times for each page can be decreased significantly.

Furthermore, since each print engine processes and prints an image portion independently from the other print engines using a unique set of print elements, the invention provides a modular architecture for the printer processing circuitry which can be scaled up to wider arrays of printheads, or which can be hierarchically scaled to have more processing power available to each printhead, i.e. fewer printheads per processor. In this way, any bottlenecks between the computer output and the printheads can be reduced and printing speeds increased to a limit determined by the speed of the printhead, the characteristics of the ink, and the speed of the paper advance.

By dividing the image into slices in the manner specified, an array of inkjet printheads lying transversely across the print medium advance direction can be subdivided into the sets belonging to the individual print engines, and each print engine processes a different slice and prints that slice with its own set of printheads.

The printing system processes data elements in columns lying along the print medium advance direction, rather than in rows perpendicular to the advance direction. The advantage gained by conventional processing is perceived to be that the system can begin to print the leading edge of the page while the image towards the trailing edge is still being processed. However, it has been found that columnar processing provides greater increases in speed and in quality due to a number of factors including the following:

1. Many halftoning algorithms are of the forward error diffusion type, in which error terms generated in the processing of a halftone pixel are carried forward into the calculation relating to the generation of an adjoining pixel. When parallel print engines operate across rows, the error terms need to be passed from one engine to another as adjoining pixels in adjacent slices are processed. This requires multiple passes of error terms between engines during the processing of each row. In contrast, by operating on columns of data elements, each processor can process an entire slice without interaction from engine to engine, other than at the boundary. This means that only a single set of error terms may need to be passed from one engine to another during the processing of an entire page.

2. In a page wide array printer, different printheads are laid out in an array spanning the width of the page. Current technology provides each printhead on a die in which individual printing elements (e.g. nozzles) are formed. Due to manufacturing limitations, different dies will provide different printing characteristics, most notably due to variations in drop volume between the nozzles of different dies. Such variations are compensated for by adjusting the image processing algorithms (preferably at the linearisation, halftoning or masking stages) to result in a variation in the firing instructions to each die. Where the halftoning is performed across rows, the settings need to be varied each time the image data elements corresponding to a different die are being processed. Therefore this may mean multiple changes across a row. In contrast, a columnar processing order allows the settings for one die to be loaded into the memory associated with a print engine, then for all of the halftoning and masking for that die to be performed, and then the next set of settings to be loaded before the columns relating to the adjacent die are processed. Each set of settings for a die need only therefore be loaded into memory once per page, rather than once per row.

3. The halftoning and masking techniques which have been (or which will in the future be) developed for scanning printers can be leveraged directly into a page wide array printer operating a column-by-column halftoning algorithm (since the image can be processed in the same manner as a single swath would be printed in a conventional scanning printer, apart from the number of pens involved).

Preferred inkjet printing systems also include a set of inkjet print elements connected to said communicating means and extending transversely across the print medium advance direction.

The function of the print element controllers may be integrated in the halftoning processors, so that the image is halftoned using a halftoning algorithm in the processor and then a print element controller module integrated in the processor generates instructions for the printheads to fire ink droplets from specific nozzles at specific times as the page moves under the printheads. Thus, the print element controllers generate drive signals (firing instructions in the case of an inkjet printer) with a print mask. However, it is currently preferred that the tasks of generating the print data sets (e.g. halftone data) and of converting the data sets to printing instructions (print masks) are carried out separately. One can also envisage that the printing components might have sufficiently sophisticated circuitry to interpret the halftone data and generate their own printing instructions directly.

Preferably, the communication between the print element controller and the printing elements of each print engine is provided by a dedicated communications channel exclusive to that engine.

Conventional printers employ a common bus between the printheads and the printhead controller(s). By providing a separate bus for each print engine the print data is separated between a number of entirely independent channels from the processor onwards and bottlenecks are eliminated.

Each processor preferably has a plurality of said print element controllers associated therewith and each of said print element controllers preferably has one or more sets of inkjet print elements under its control.

In this way, a hierarchical structure of e.g. 4 printing component controllers each having 4 printheads can be under the control of a single processor, with this hierarchical arrangement repeated in parallel a number of times for optimum print speeds.

Further, preferably, the respective sets of print elements are each fixed in position in use to provide a print element array whose width defines a printing area.

Optionally, the printer further comprises a raster image processor (RIP) for generating rasterised data from a print job received from an input of the inkjet printing system, and means for providing said rasterised data to said halftone processors. Alternatively the file received by the printer can be rasterised by a PC or a print server before being sent to the printer.

Preferably, the means for providing rasterised data comprises a common communications channel linking said RIP to said halftoning processors, each halftoning processor comprising means for identifying and selecting from said rasterised data arriving over said common communications channel a subset of data corresponding to a portion of the image to be printed.

Thus, the processors themselves have the capability of splitting the image into slices by selecting from a rasterised data stream arriving over a common bus those data elements corresponding to the slice of image for which they are responsible.

In one embodiment said columns terminate at first and second ends and said halftoning processors operate by:
sequentially processing image data elements of a first column from the first end to the second end;
sequentially processing image data elements of an adjacent unprocessed column from the second end to the first end;
continuing to sequentially process image data elements of adjacent unprocessed columns beginning at the end where the processing of the previous column terminated until all columns of the slice have been processed.

Preferably, each halftoning processor operates a forward error diffusion algorithm whereby the error term(s) resulting from processing an image data element can always be carried into an adjacent image data element due to the serpentine manner of processing said columns beginning at alternate ends.

Further, preferably, a first halftoning processor of a first print engine responsible for processing a first slice at one side of the image is configured to begin with the column corresponding to the edge of the image and upon completion of the processing of that slice, to pass the final error term(s) resulting from processing the slice to the halftoning processor of the print engine responsible for processing the immediately adjacent (second) slice.

Preferably, the slices of the image are sequentially processed across the image, whereby the error term(s) resulting upon completion of a particular slice are passed to the halftoning processor responsible for processing the next adjacent unprocessed slice before that halftoning processor begins its processing of its slice.

In a multi-page print job having at least n pages, upon completion of the halftoning of a given page slice, each halftoning processor can be advantageously configured to proceed to the corresponding slice of the next page after passing the error terms to its neighbour. The neighbour takes up where the first processor left off, and thus when the first halftoning processor is processing the first slice of the nth page, the processor to which it passes its error term(s) is processing the second slice of the (n−1)th page.

In alternative embodiments, said columns terminate at first and second ends and said halftoning processors operate by sequentially processing image data elements of said column from the first end to the second end.

Suitably, adjacent columns are processed sequentially across the image slice beginning at a column lying along one boundary thereof and ending at the column lying along the opposite boundary thereof.

The first end may corresponds to the end of the image slice closest to either the leading edge or the trailing edge of the print medium as it advances through the printing system.

In a particularly advantageous printing system, each print engine generates print element control instructions for a plurality of print elements provided on discrete printhead dies, and wherein each die has a set of settings associated therewith for use in the halftoning process and/or the generation of print element control instructions, whereby all of the print data for a given die can be produced before the settings are changed for the next die.

In a further aspect the invention provides a halftoning processor comprising an input, data selection means for identifying and selecting an operational data set from rasterised data available to said input, wherein said rasterised data represents an image of a page and said operational data set represents only a slice of said image having a width less than the width of the full image of the page and having a lateral boundary lying along a print medium advance direction, algorithm execution means for performing an algorithm on said operational data set to generate halftone data relating to the operational data set, and an output for outputting said halftone data, wherein said algorithm is operative to sequentially process data elements representing columns of image elements lying along the print medium advance direction.

Preferably, the rasterised data on which such a processor operates comprises a plurality of data items each having one or more positional identifiers associating the data item with a position in the represented image, and the data selection means is operative to determine a set of positional identifiers corresponding to a portion of the image, and to select from the rasterised data those data items having positional identifiers in the determined set.

More preferably, the data items represent pixels in an image having a length and a width, the positional identifiers are effective to identify the position of the pixel in the image, and the data selection means is operative to determine the positional identifiers of the set of pixels lying in a specified range of positions along the width of the image.

The invention also provides an array of halftoning processors as indicated above, each of which has an input connected to a common data source and an output connected to a dedicated and separate communications channel for supplying said halftone data to a unique set of printing components.

In another aspect the invention provides a method of processing input data representative of an image for printing by a printing system, the method comprising the steps of:
a) selecting a first set of data items relating to a first slice of the image to be printed;
b) selecting a second set of data items relating to a second slice of the image to be printed;
c) with a first print engine, processing said first set of data items and printing said first portion of the image; and
d) with a second print engine, processing said second set of data items and printing said second portion of the image;
wherein said first and second print engines operate in parallel to simultaneously print said first and second portions of the image on a print medium which passes the print engines in a print medium advance direction and said slices share a boundary lying parallel to a print medium advance direction and wherein each engine processes data items sequentially within each slice along columns lying parallel to the print medium advance direction.

Preferably, steps a) and b) each comprise:
determining for the portion of the image to be selected a set of positional identifiers distinguishing the items of input data relating to that portion.

Preferred embodiments of the method further comprise the steps of:
selecting one or more additional set(s) of data items relating to one or more additional portion(s) of the image to be printed;
with one or more additional print engine(s), processing said additional set(s) of data items and printing said additional portion(s) of the image;
wherein all of the print engines operate in parallel to simultaneously print said portions of the image on a print medium and wherein the number of print engines is equal to the number of image portions forming the complete image to be printed.

Preferably, each print engine comprises:
i) a halftoning processor to operate on image data in a slice to be processed and to generate halftone data therefrom, and
ii) a print element controller for receiving halftone data from the halftoning processor and generating print element control instructions therefrom for communication to a set of print elements.

In the simplest preferred arrangement the number of print engines is equal to the number of parallel slices forming the complete image to be printed.

In a further aspect of the invention there is provided a computer program comprising a set of instructions which when executed carry out the method of the invention.

The computer program may be embodied in a computer, in the circuitry of a printer, or divided between a computer and a printer.

In a further aspect the invention provides a printing system comprising a plurality of print engines each of which is adapted to print a different slice of an image, wherein the boundaries between slices are parallel to a print medium advance direction, and wherein each engine comprises:
a) an image processor for generating print data from an input set of image data items, and
b) a print element controller for receiving print data from the processor and generating print element control instructions therefrom for communication to a set of print elements, and
wherein said image processor processes the image slice by sequentially processing columns of image data elements, said columns lying along the print medium advance direction in the printed image.

The term "print element" as used herein refers to an individual print-creating device such as an inkjet printhead or pen. The term also encompasses other types of print-creating components such as dot matrix printheads or indeed any other type of device which can be arranged in arrays whereby each device prints a portion of the image across the page. The printers of the present invention may be adapted to receive such printing components in an array, and so the printing components need not form part of the printer and can be replaceable. The means for receiving the array can be a simple mounting axis on which the components are fixed in position by suitable attachment means.

Preferably, in this aspect of the invention, each print data set comprises halftone data for the slice of image to which it relates. However, for printers which operate by printing images other than in halftone, correspondingly different print data sets are generated by the processors.

For the avoidance of doubt, the terms "preferred", "preferably" and words and phrases of similar meaning, when used herein, are an indication that the features to which they refer are not essential features of the invention.

BRIEF DESCRIPTION OF DRAWINGS

The invention will now be illustrated by the following descriptions of embodiments thereof given by way of example only with reference to the accompanying drawings, in which.

DETAILED DESCRIPTION OF PREFERRED EMBODIMENTS

Figure 1:
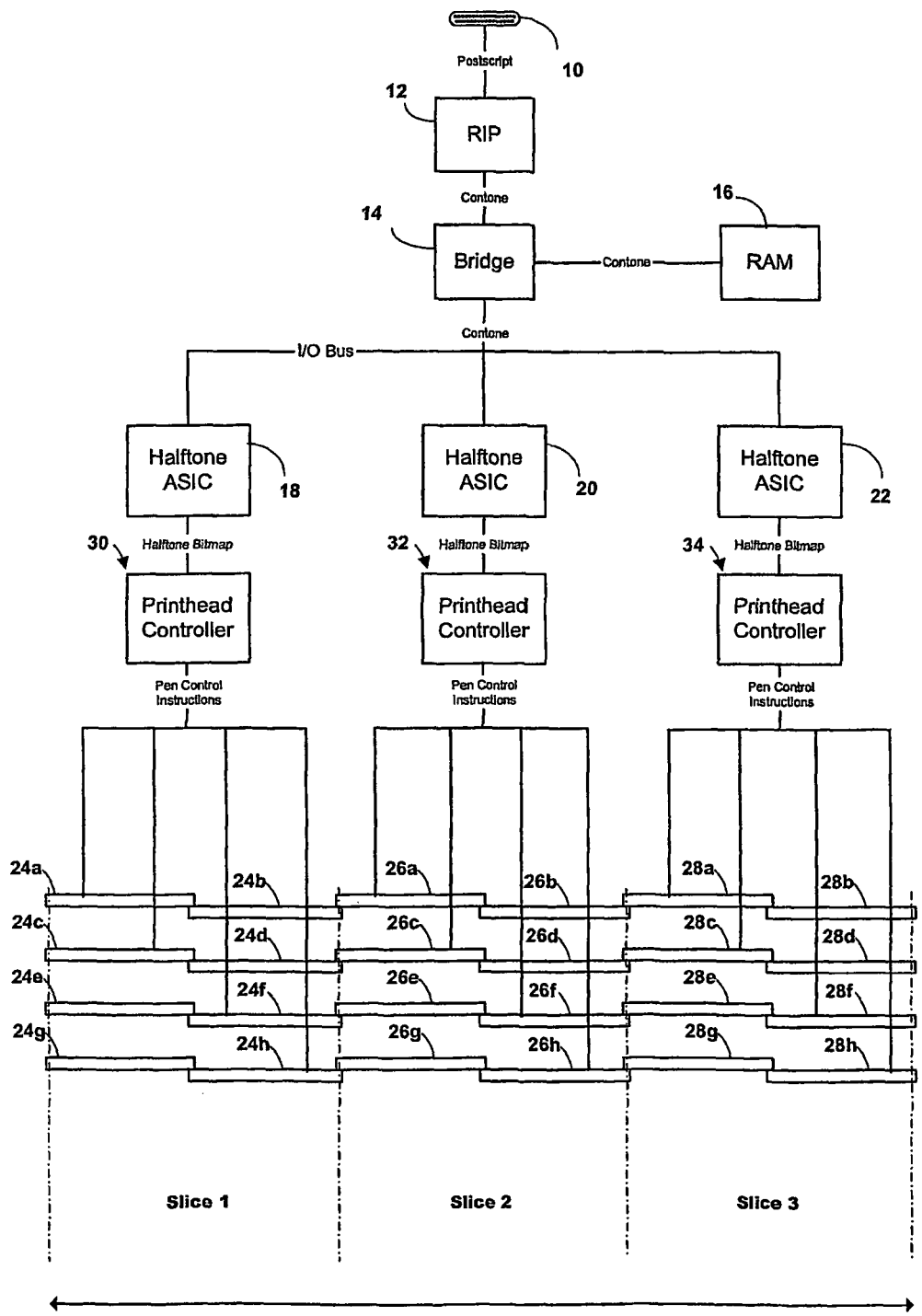
FIG. 1 is a block diagram of the architecture of a printer according to an embodiment of the invention.

FIG. 1 shows the main components of a printer according to an embodiment of the invention, which receives print jobs from a computer directly connected to the printer via a parallel port 10. The same printer could be used to print from a local area network connection or from a wide area network connection, e.g. over the Internet.

Print jobs are received by the printer in any one of a number of supported formats, such as in the form of Postscript™ files (although the skilled person will be aware that the nature of file received as a print job can vary according to prevailing standards and the use to which the printer is to be put).

A raster imaging processor (RIP) 12 receives the incoming print jobs and converts them to a rasterised bitmap, in known manner. The output of the RIP in the embodiment being described is a contone image file. The print job is processed on a page-by-page basis with each page being rasterised in turn and forwarded via a bridge 14 to a RAM buffer 16 which stores multiple pages to allow print jobs to be sent quickly to the ASICs for further processing and avoid delays due to real time processing of the images which might otherwise occur.

In the present embodiment, the RIP also implements a conventional linearisation process on the contone image data. In other embodiments this may be performed by other functional elements in the printing pipeline. Thus, a transformation is applied to image data to prevent or reduce discontinuities or other artefacts in the printed output which may otherwise arise due to the set-up of a given printer system.

One of the primary sources of discontinuity likely to arise is vertical banding due to variations between the output volumes of nozzles on different printhead dies.

The RIP linearises in conventional manner. During this process it also allows the data to be modified for different drop volumes from different dies. Also, the RIP processes the image data in an order in which data requiring common corrections are processed as a block of data. In this way, the settings to correct each group may be loaded into memory at the beginning of processing each block of data.

The parameters or settings for each printhead group (i.e. each set of four printheads printing overlapping dot patterns, such as printheads 24a,24c,24e,24g) are loaded in and the band of image to be printed by these four printheads are linearised first. Then the settings for the next group (24b,24d, 24f,24h) are loaded and the portion of image to be printed by this group is linearised. This process will be described further in detail below.

The bridge provides a link between the RIP or the RAM buffer to a common I/O bus which connects to three parallel halftoning ASICs 18,20,22. Each ASIC is essentially identical and comprises a dedicated halftoning processor which is designed to convert a contone bitmap input to a halftone output specified in the ink colours provided in the printer. In the illustrated embodiment the printer is a CMYK printer and so the halftone image will specify each pixel of the halftone image as a combination of halftone dots of one or more of the four CMYK colours.

Each ASIC 18,20,22 is dedicated to processing a particular parallel slice of the image, where the image is sliced into three equal strips. The strip boundaries run along the direction of the page advance, so that for any particular swath of the image printed by the PWA of printheads (described below) each ASIC is responsible for specifying the dots printed in one third of the swath.

The output of each ASIC specifies the halftone bitmap for a group of eight pens 24a-h,26a-h,28a-h. These bitmaps are converted into pen firing instructions by a corresponding set of three printhead controllers 30,32,34. The printhead controllers are ASICs which analyse the halftone bitmap for the slice under their control and generate from the bitmap a set of firing instructions for the pens covering that slice (i.e. converting the halftone pixels into droplet specifications for the particular colours). While the halftoning ASIC can drive multiple printhead controllers the illustrated embodiment only has one printhead controller per halftoning ASIC.

The illustrated embodiment thus has three print engines. The first print engine comprises halftoning ASIC 18, printhead controller 30, and pens 24a-h. The second print engine comprises halftoning ASIC 20, printhead controller 32, and pens 26a-h, and the third print engine comprises halftoning ASIC 22, printhead controller 34, and pens 28a-h.

Each group 24,26,28 of pens includes two yellow pens (24a,24b), (26a,26b), (28a,28b), two magenta pens (24c, 24d), (26c,26d), (28c,28d), two cyan pens (24e,24f), (26e, 26f), (28e,28f), and two black pens (24g,24h), (26g,26h), (28g,28h), with each pen being a conventional inkjet printhead comprising a linear array of closely spaced nozzles extending along the direction of the pen. The pens are arrayed in four parallel arrays ab,cd,ef,gh extending across the width 42 of the page and are overlapped slightly so that the nozzles of any particular colour from the six pens of that colour provide page wide coverage of the printable area.

Although not shown in the illustration, the printer could contain additional arrays of pens of the same primary colours to provide nozzle redundancy. In this case the printhead controllers 30,32,34 distribute the halftone dots among those pens of the same colour that share that portion of the page following a masking or similar algorithm.

In this way the page can be printed in three slices, shown as slices 1,2 and 3 in FIG. 1. The left-hand of slice 1, for example, receives its droplets of the four ink colours from pens 24*a,c,e,g* and the right-hand from pens 24*b,d,f*.

The technology is scaleable and higher throughput can be achieved by having more than three slices for a given page width. Furthermore, by increasing the amount of processing power dedicated to each pen, the printing speed can be increased, this is achieved by configuring the printer with narrower slices.

Figure 2:
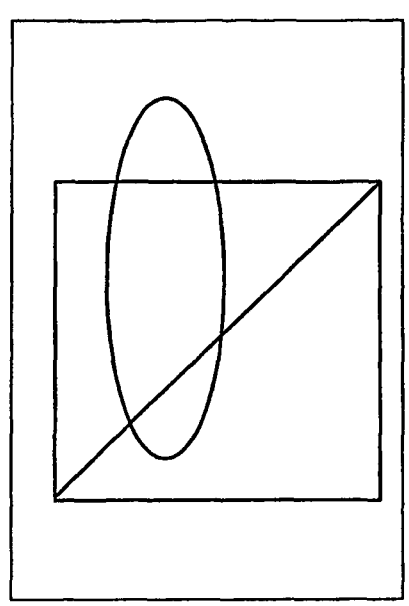
FIG. 2 is a representation of an image file sent to the printer for printing.
Figure 3:
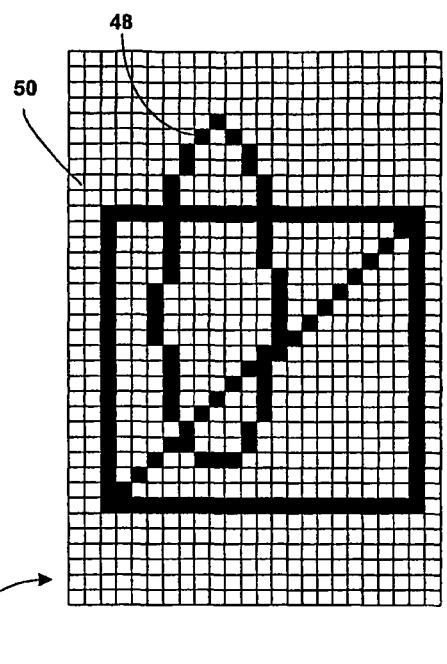
FIG. 3 is a representation of a rasterised version of the image of FIG. 2.

FIG. 2 shows a simple image sent as a print job to the printer. The image 44 is received by the RIP 12 and is rasterised to provide a pixelated image 46 (FIG. 3) of differently coloured pixels 48, 50. (The image shown in FIGS. 2 and 3 is black and white for simplicity but it will be appreciated that a coloured image will give rise to a large number of different colours of pixels).

The rasterised image is processed sequentially in blocks of data to compensate for the variations between printhead die printing characteristics (such as droplet volume), where each block of data corresponds to a die or set of dies printing along the same portion of the printhead array.

Figure 4:
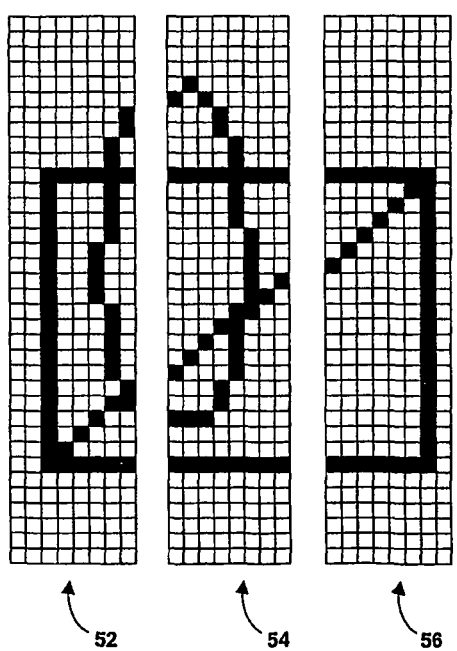
FIG. 4 shows the slices of the rasterised image of FIG. 3 as sent for processing to the three individual halftoning processors of FIG. 1.

The rasterised image is then optionally buffered and fed to the halftoning processors 18,20,22, where it is split into three parallel slices 52,54,56, as shown in FIG. 4.

In practice the splitting occurs as the halftoning ASICs capture the image file from the RAM buffer through the I/O bus. The halftoning processors are configured to pick out the pixels in the particular slices assigned to each halftoning ASIC. This may be achieved simply by reading the appropriate DRAM addresses of the buffer. More preferably, each ASIC will determine that for a page of a given width W (W being the number of pixels), it is responsible for W/3 pixels per line. The first ASIC reads the pixels "numbered" from 1 to W/3 in each line. The second ASIC reads the pixels from (W/3+1) to 2W/3, and the third ASIC reads the pixels from (2W/3+1) to W in each line.

By this means the rasterised contone image is divided in three for further processing, and each halftone ASIC 18,20,22 operates on its own set of pixels to generate the print data set for that slice of the page, e.g. by using a conventional halftoning algorithm. However, whereas the algorithm used may be conventional, the order in which it operates on image data elements is not, in that the halftoning is performed column-by-column rather than row-by-row.

Figure 5:
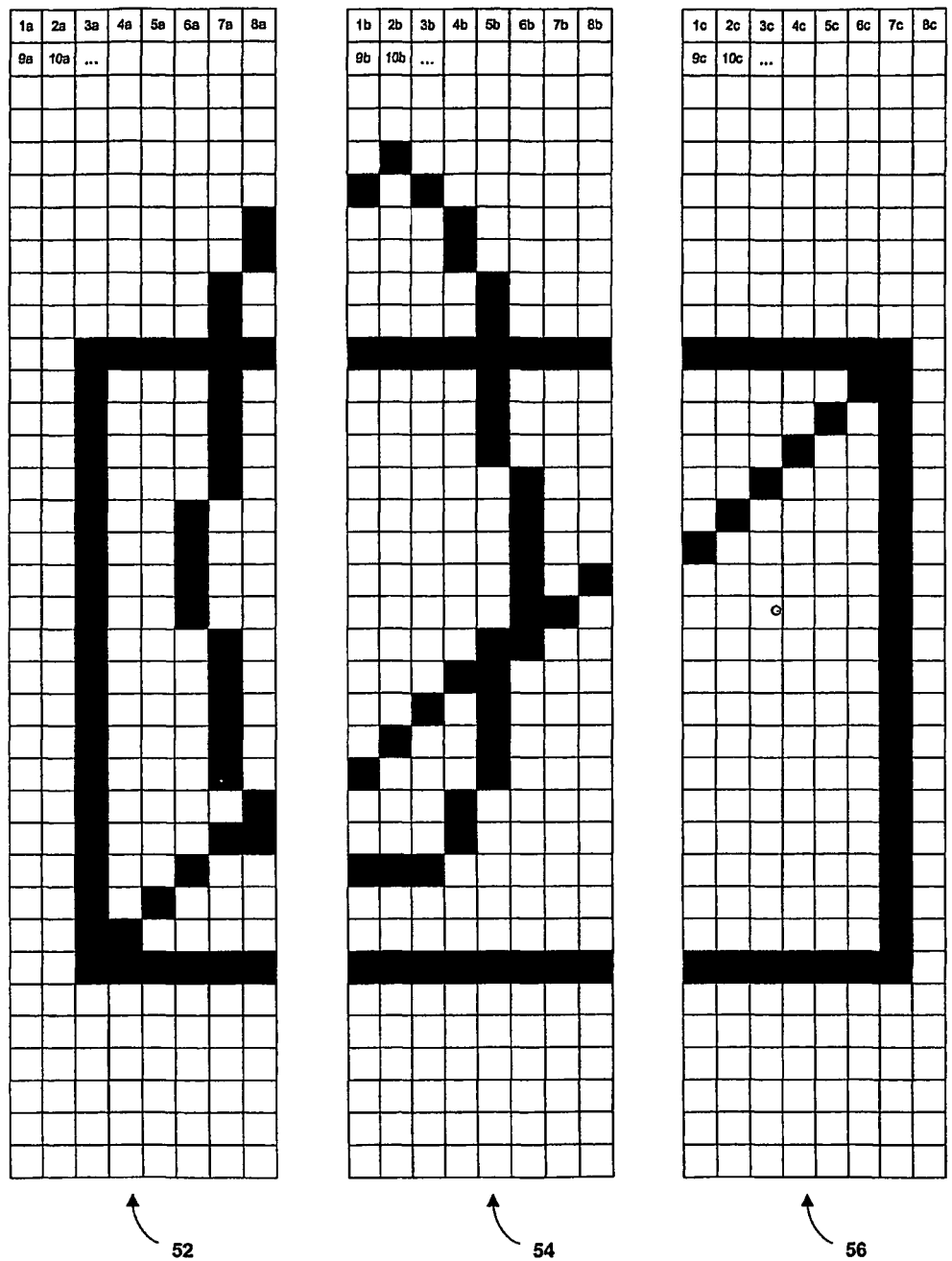
FIG. 5 is an enlarged view of the slices illustrating the order of processing of the raster bitmap pixels by the three processors using a matrix algorithm.

FIG. 5 illustrates a parallel process for processing the contone bitmap. In the example of FIG. 5, the halftoning ASICS operate on the pixels using a matrix algorithm which contains no forward diffusion of error terms. Thus, processor 18 will operate on its contone bitmap in the pixel order 1*a*,2*a*,3*a*, 4*a*, . . . without any reference to the other processors. Similarly processor 20 operates on pixels 1*b*,2*b*,3*b*,4*b*, . . . and processor 22 on pixels 1*c*,2*c*,3*c*,4*c*, . . . , etc.

As the halftone images are generated they are sent to the printhead controllers 30,32,34 for real time generation of firing instructions.

Figure 6:
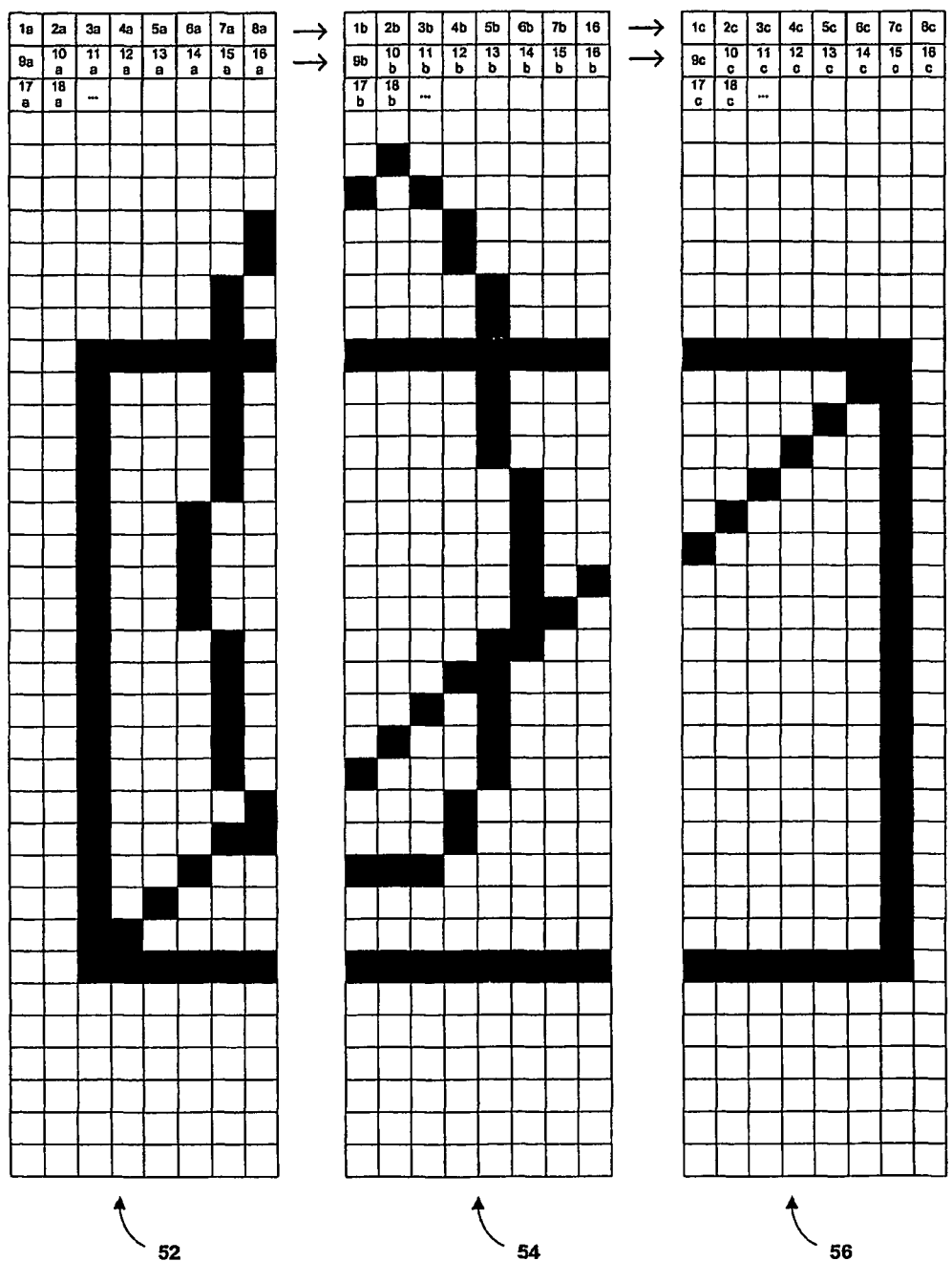
FIG. 6 is an enlarged view of the slices illustrating the order of processing of the raster bitmap pixels by the three processors using a linear forward error diffusion algorithm.

In FIG. 6 a more sophisticated halftoning algorithm is shown which relies on the forward diffusion of error terms in the contone bitmap. The algorithm used is a linear algorithm, and operates across the three slices in turn. Thus, after the first of the processors 18 has processed pixels 1*a*,2*a*, . . . , 7*a*,8*a*, it delivers the error term to processor 20, at this point processor 18 can start processing the next line 9*a*,10*a*, . . . since there are no further dependencies. Processor 20 carries forward the error term from pixel 8*a* to process pixels 1*b*,2*b*, . . . , 7*b*,8*b* before handing over in turn to processor 22. Thus processor 18 is one line ahead of processor 20 which in turn is one line ahead of processor 22 and so the 3 processors work in pipeline fashion. Once the pipeline has been filled up the three processors work in parallel. The mechanism for handling over the error term can be achieved either through the same bus or a dedicate link between processors.

Figure 7:
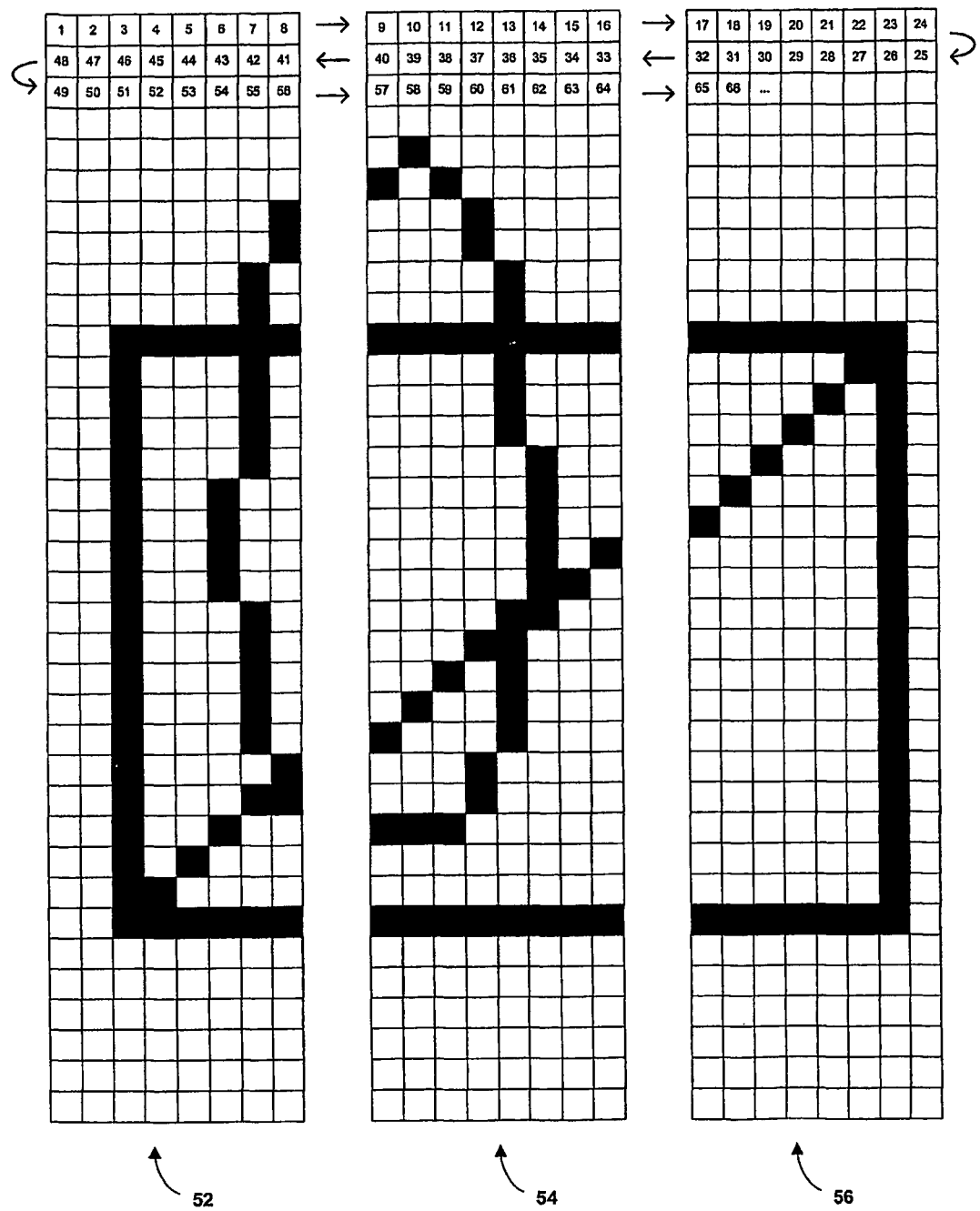
FIG. 7 is an enlarged view of the slices illustrating the order of processing of the raster bitmap pixels by the three processors using a first serpentine forward error diffusion algorithm.

FIG. 7 shows a variation on this algorithm where instead of a linear left-to-right processing order, the direction of processing is reversed for each row in a serpentine fashion. Thus, while the first row is processed in the order described above for FIG. 156, processor 22 begins processing the second row with the pixel shown as 25 in FIG. 7. This serpentine error diffusion algorithm can achieve higher quality output but it creates dependencies in both directions. Thus processor 18 after it has processed pixel 8 is stalled until it receives the error term for pixel 41 from processor 20. In a similar way processors 20 and 22 are also stalled. Thus this serpentine error diffusion algorithm offers no parallelism and at any point in time only one processor is working while the others are stalled.

Figure 8:
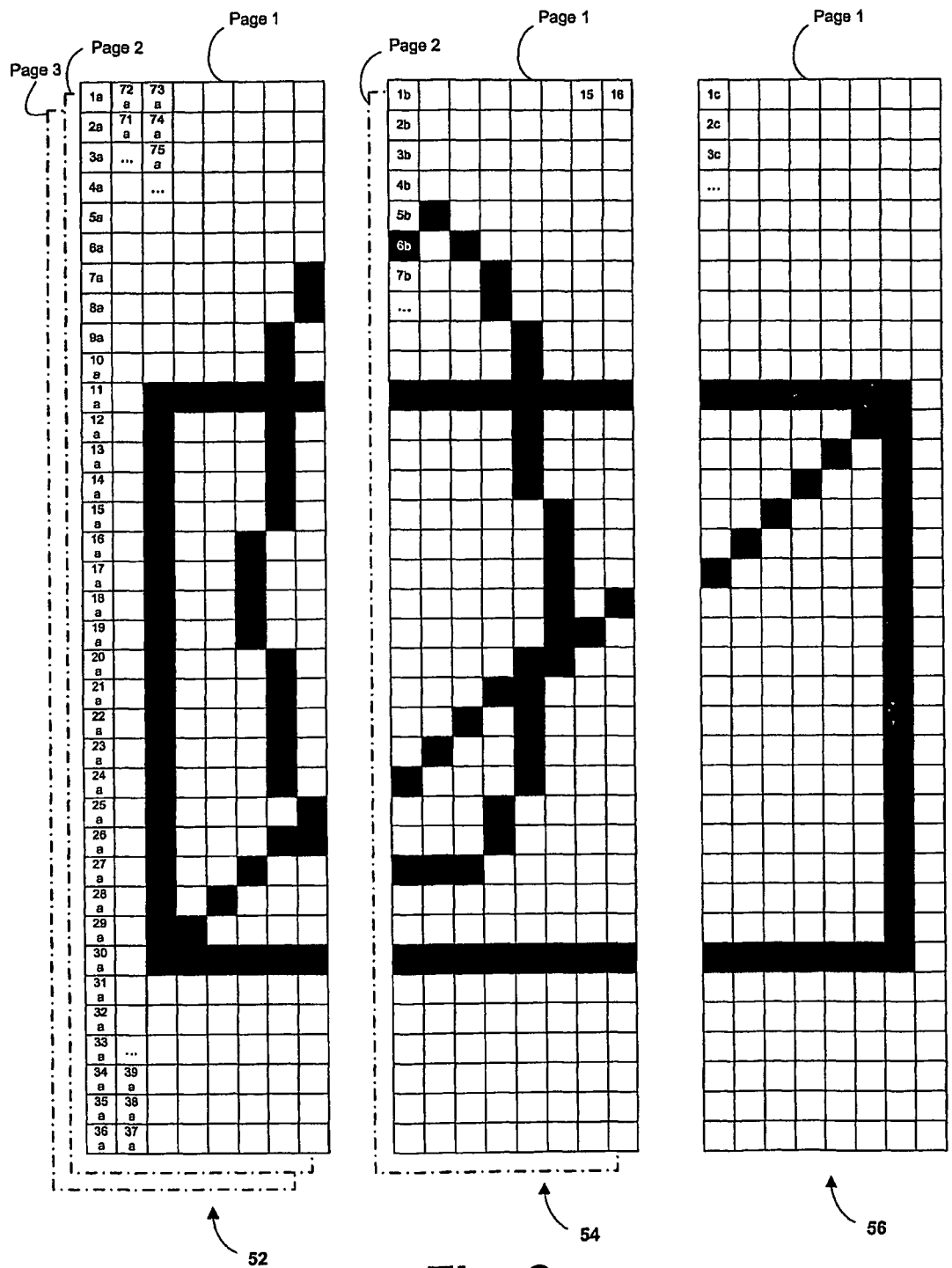
FIG. 8 is an enlarged view of the slices illustrating the order of processing of the raster bitmap pixels by the three processors using a second serpentine forward error diffusion algorithm.

FIG. 8 shows a particularly preferred embodiment which overcomes this difficulty by halftoning the individual slices of the page longitudinally as opposed to transversely. Thus, processor 18 performs a serpentine algorithm down and up the columns as opposed to across the rows of pixels, in the order 1*a*,2*a*,3*a*, . . . etc. Once it has finished with the slice, processor 18 delivers a full row of error terms to processor 20. At this point processor 18 can start processing the left-hand slice of the next page of the print job and processor 20 is then free to process its slice in the order 1*b*,2*b*,3*b*,4*b*, . . . etc. When processor 20 finishes processing the centre slice of the first page it delivers the row of error terms to processor 22.

At this point processor 18 will have finished processing the left-hand slice of page 2 and given the error terms for page 2 to processor 20, which can then start processing the centre slice of page 2 (allowing processor 18 to start processing page 3). Processor 20 similarly hands its row of error terms from page 1 to processor 22, allowing processor 22 to begin processing the right-hand slice of the first page. Thus processor 18 is one page ahead of processor 20 which in turn is one page ahead of processor 22, and the 3 processors work in pipeline fashion. Once the pipeline has been filled up the three processors work in parallel.

The following table illustrates the order of processing of the various slices on successive pages of an n-page print job. In this table, a timeslot is the length of time required for a processor to receive the error terms associated with the pixels of a slice, then to process the slice, and finally to hand over the error terms from that slice to the next processor (where applicable). Thus, from timeslot 3 onwards, each of the processors processes a slice in parallel with the other processors but with processor 18 leading processors 20 and 22 by 1 and 2 pages respectively.

| Timeslot # | Processor 18 (Left Hand Slice) | Processor 20 (Centre Slice) | Processor 22 (Right Hand Slice) |
|---|---|---|---|
| 1 | Page 1 | Idle | Idle |
| 2 | Page 2 | Page 1 | Idle |
| 3 | Page 3 | Page 2 | Page 1 |
| 4 | Page 4 | Page 3 | Page 2 |
| 5 | Page 5 | Page 4 | Page 3 |
| . . . | . . . | . . . | . . . |
| . . . | . . . | . . . | . . . |

| Timeslot # | Processor 18 (Left Hand Slice) | Processor 20 (Centre Slice) | Processor 22 (Right Hand Slice) |
|---|---|---|---|
| n − 1 | Page n − 1 | Page n − 2 | Page n − 3 |
| n | Page n | Page n − 1 | Page n − 2 |
| n + 1 | Idle | Page n | Page n − 1 |
| n + 2 | Idle | Idle | Page n |

In this way the sophistication of a forward error diffusion algorithm is utilised whilst reducing the extent to which each processor is dependent on the results of the others.

If the same algorithm, which is advantageous as it provides a high quality of halftone output, were to be used across the rows (i.e. pixels 1a, 72a, 73a, . . . , 1b, . . . , 1c), then dependencies would be created in both directions as the algorithm worked back and forth across the rows. Thus processor 18 after it has processed the right-most pixel in the top row of its slice, would remain stalled until it receives the error term for pixel 2b from processor 20. In a similar way processors 20 and 22 are also stalled. Thus this serpentine error diffusion algorithm would offer no parallelism and at any point in time only one processor is working while the others are stalled.

Figure 9A:
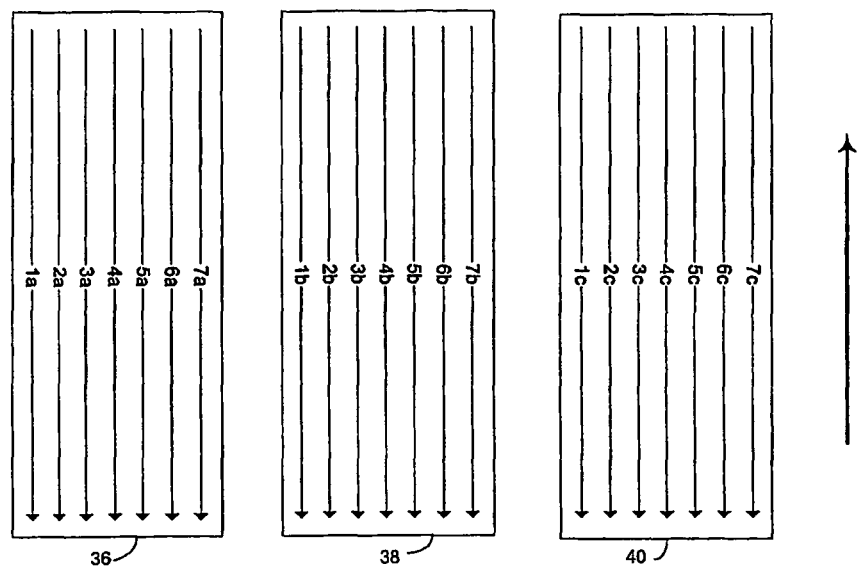
FIGS. 9A-9D illustrate schematically four further orders in which an image slice can be processed.

FIGS. 9A-9D show some alternative orders of processing pixels. FIG. 9A schematically illustrates a first alternative mode of processing pixels in columns. For simplicity, an image is shown divided into three slices 40, 42,44, with each slice being processed by a different halftoning processor. The heavy arrow 46 indicates the direction of print medium advance. A first halftoning processor processes columns in the slice 40 sequentially beginning with column 1a and ending with column 7a (of course, there will be more than seven columns of pixels in a typical print image slice, but the purpose of this schematic representation is to illustrate that the pixels are processed from the leading edge to the trailing edge beginning at the left-hand boundary and ending at the right-hand boundary). The second and third halftoning processors similarly process the columns from the leading edge to the trailing edge beginning at the left-hand boundary and ending at the right-hand boundary. Unlike the serpentine processing of FIG. 5, therefore, there are no error terms passed from column to column. Accordingly, the algorithm used does not include any forward error diffusion.

Figure 9B:
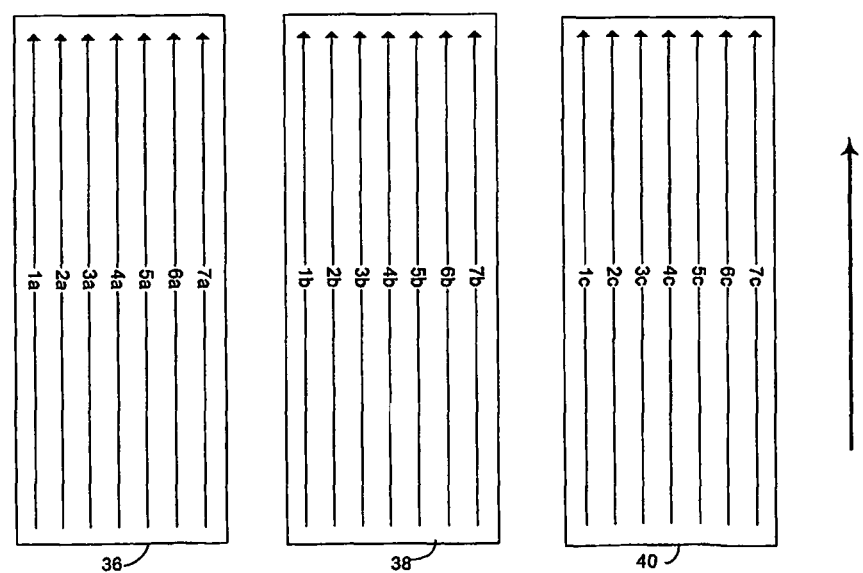
Figure 9C:
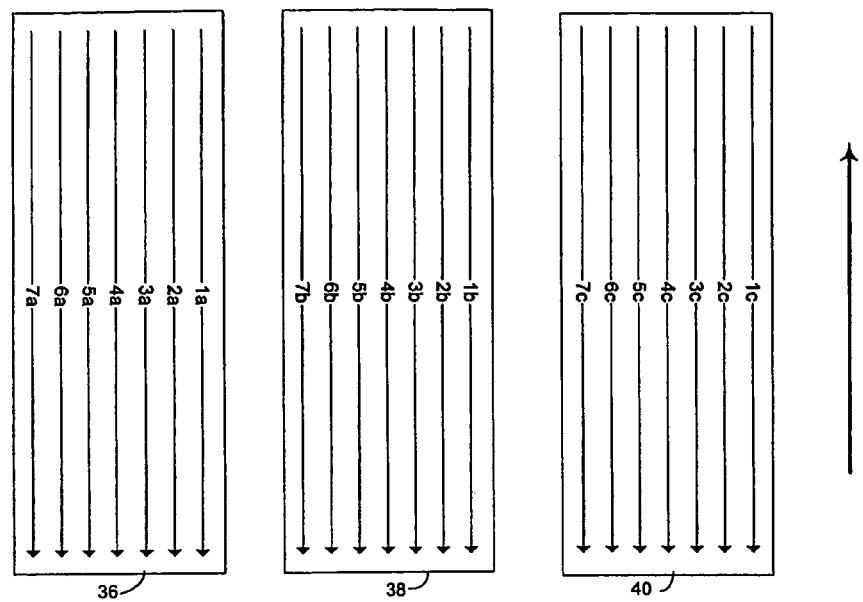
Figure 9D:
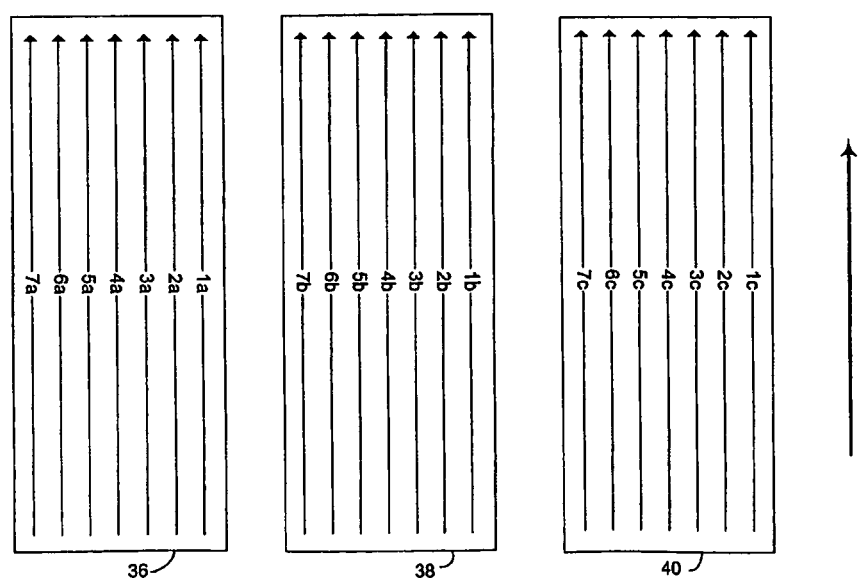

In FIG. 9B, a similar algorithm is used, but each of the columns is processed beginning with the trailing edge and ending at the leading edge. FIGS. 9C and 9D illustrate methods of processing columns of pixels identical to the processes of FIGS. 9A and 9B, respectively, but in which the first column to be processed in each slice is at the right-hand edge and the last column is at the left-hand edge.

In the case of all of the processing orders shown in FIGS. 9A-9D, while a serpentine algorithm is not used, it is nevertheless possible to take advantage of the benefits provided by the invention, in particular the opportunity of loading the settings for a first pen, halftoning and masking all the image data elements to be printed by that pen, and then discarding those settings before loading the settings for the next pen. Furthermore, there are no dependencies between the three lines responsible for printing slices 40, 42 and 44.

Figure 10:
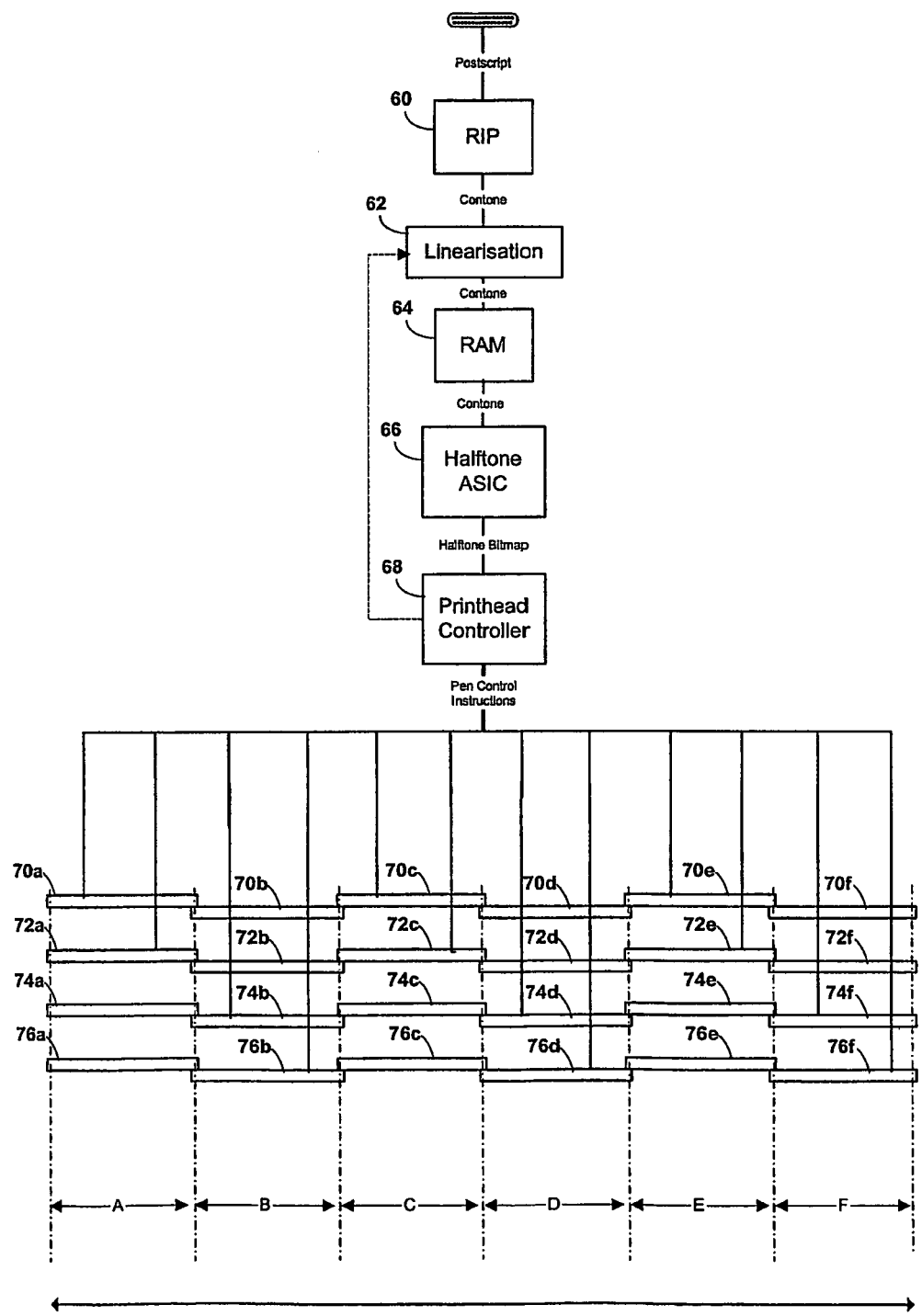
FIG. 10 is a block diagram of the architecture of a printer according to a second embodiment of the invention.

FIG. 10 shows a further embodiment of a printing system in which the printing pipeline comprises a RIP 60, a dedicated linearisation ASIC 62, a RAM buffer 64 for storing the linearised contone data, a halftone ASIC 66 and a printhead controller 68. (Unlike the previous embodiments, this embodiment halftones an entire page-wide image with a single halftoning ASIC rather than splitting the image into separate slices for independent halftoning.)

The page wide array of printing nozzles comprises four printbars 70,72,74,76 (printing C,Y,M and K inks respectively). Each printbar is made up of nozzles provided on six printheads 70a-70f, 72a-72f, 74a-74f, 76a-76f, with each printhead being provided as a separate die. Each printhead will have unique operational characteristics (in terms of variations in droplet volume, nozzle imperfections, etc.). Image data processing in the printing pipeline can therefore be normalised or adjusted as discussed herein to compensate for variations in operational characteristics between the printheads.

The normalisation can be performed at any point in the printing pipeline, such as in the printhead controller, the halftoning processor, the linearisation processor or in the RIP. It is generally preferred to carry out this adjustment on contone data such as during linearising rather than on halftone data. The reason for this is that a contone data set can be varied more precisely simply because the image is specified as a set of continuous tone planes which can be varied very finely to make small compensations. In a halftone data set, on the other hand, the image is less easily varied by small degrees.

The linearisation ASIC is programmed with the number and spatial relationship of the printhead dies. It therefore "knows" that each group of nozzles is responsible for printing a certain colour of ink over a given portion A,B,C,D,E or F of the page width. The image is thus adjusted according to printhead characteristics, portion by portion in the following manner:

the settings to compensate for the operational characteristic(s) of interest for the four printheads 70a,72a,74a,76a are loaded from memory and used to compensate or adjust the contone data corresponding to the entire portion A of the image page, i.e. the portion to be printed by the first printhead group 70a,72a,74a,76a;

this adjusted data set for portion A of the image is stored in the buffer and the settings discarded;

the settings to compensate for the second printhead group 70b,72b,74b,76b are loaded into memory and the contone data for the and used to compensate or adjust the contone data corresponding to the entire portion B of the image page, i.e. the portion to be printed by the first printhead group 70b,72b, 74b,76b; etc.

the compensation is repeated for each of the portions A-F, only involving five changes in the compensation parameters.

In the embodiments described above, two types of efficiency in the printing pipeline have been described: (i) treating the page as a set of parallel "slices" and halftoning these slices independently, in particular running the halftoning algorithm on successive pixels of columns; and (ii) adjusting at least one step of the image processing to take into account differences in the operating characteristics of groups of image generating elements, by processing blocks of data (corresponding to portions of image to be printed by each group) sequentially, and loading new settings for each group in turn as each block of data is processed. As was indicated in the description of FIG. 1, these concepts are preferably used together though they can be implemented independently from one another (such as in the FIG. 10 embodiment).

Figure 11:
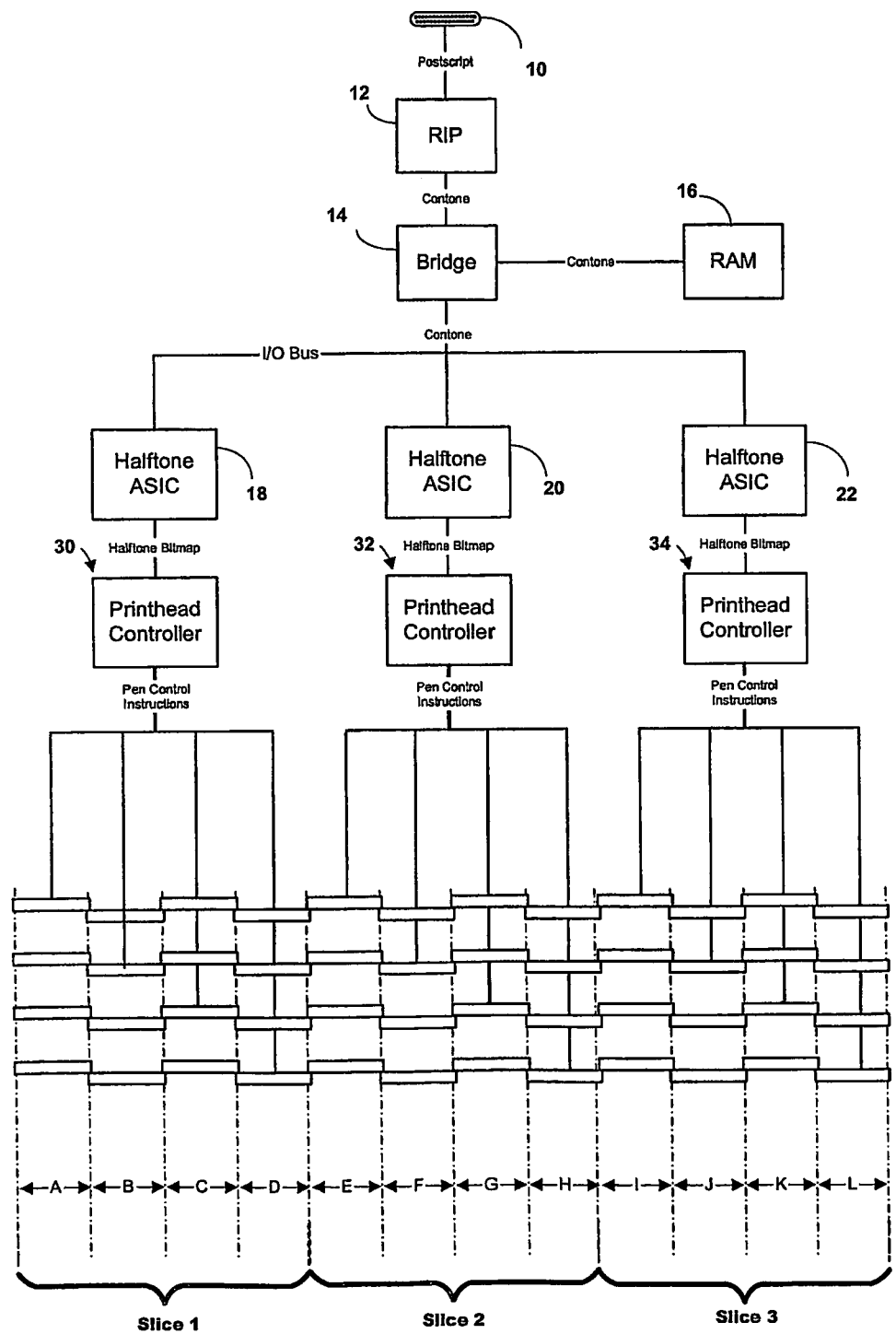
FIG. 11 is a block diagram of the architecture of a printer according to a third embodiment of the invention.

FIG. 11 illustrates an embodiment where the concepts of image "slices" (for parallel halftoning) and image "portions" (for printing by groups having differing characteristics) can be seen more clearly. As with FIG. 1, three parallel print engines operate to halftone data and generate printhead firing instructions (by means of three halftoning processors 18,20, 22 and three printhead controllers 30,32,34, respectively).

These engines are responsible for the final stages of the printing pipeline for each of three slices identified at the bottom of the figure. Within each slice (i.e. under the control of a given printhead controller) is a set of 16 printheads (four adjacent printheads in each of the four ink colours) to give 48 printheads in total.

When viewed as a composite four colour image, therefore, the page is composed of 12 portions corresponding to the 12 printhead groups. When viewed as four superimposed colour planes, the image has 48 portions (4 colours×12 printheads or nozzle groups per colour).

Therefore, depending on how the image is being processed at the point when the adjustment takes place, the respective "portions" of image to be printed by a "group" of image generation elements may be defined differently. If the image data being compensated for comprises all of the colours, then each portion of image will be adjusted using the settings for the group which prints this image, namely a group of nozzles on different colour printheads. On the other hand, if the data for each colour is processed separately, then each portion is a single colour portion which must be adjusted for the characteristics of the image generating elements printing that colour, i.e. the "group" will be defined as a group of nozzles printing just that portion (i.e. colour).

Each printhead group (or each corresponding set of four nozzle groups) is responsible for printing a respective one of 12 image portions A-L. If the compensation for different operating characteristics is performed in the RIP, the RIP will therefore process the page data in 12 blocks of data. The relationship of the blocks A-L to the image itself can be seen in FIG. 12.

Figure 12:
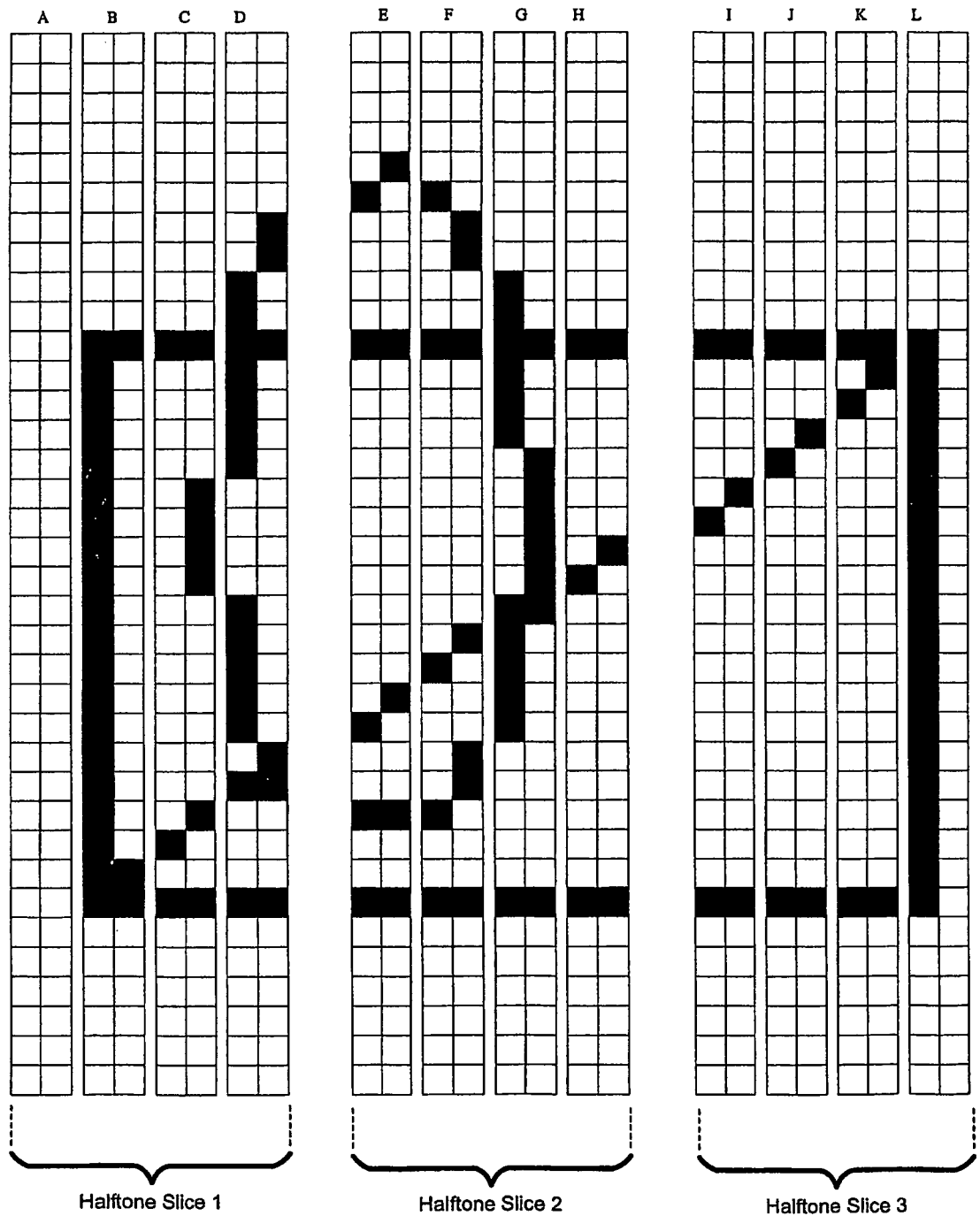
FIG. 12 is an illustration of the relationship between slices for printing by print engines and portions to be printed by groups of image generating elements.

The image in FIG. 12 is sliced into three slices, and each slice is composed of four portions (thus, for example, slice 2 is composed of portions E,F,G,H). Each of the four portions in a given slice is to be printed by a different set of four staggered printheads in this embodiment, and for this reason the four printheads constitute a group. Each portion is indicated in FIG. 12 to be 2 pixels wide but of course portions may be composed of many more pixels than this in reality.

The halftoning process may be adjusted slice by slice with settings or parameters to vary the output to compensate for variations in printhead characteristics, or the compensation may occur at another point in the printing pipeline (such as in the RIP, in a linearisation step, or even in the printhead controller as it applies the print mask).

If the halftoning of each slice is where the compensation occurs, then the halftoning process of each slice (conducted in parallel with that of the other two slices), should be carried out in a columnar order (see FIGS. 8 and 9A-9D as opposed to FIGS. 5-7). This will enable the columns corresponding to one printhead to be halftoned using settings for that printhead, then new settings to be loaded in advance of the columns for the next printhead being processed, and so on until all of the portions of the slice corresponding to the individual printheads have been sequentially halftoned.

While the embodiments above have been described as colour printers, they need not be. Printers operating in monochrome (such as "black and white" or other single colour printers) also benefit from the advantages of the invention due to the improved data processing. For example, a black printer with a set of redundant printheads could have the characteristics of each printhead group compensated for according to the invention, improving the data flow rate through the printer.

The invention is not limited to the embodiments described herein which may be varied without departing from the spirit of the invention.

The invention claimed is:

1. A method of processing input data representative of an image for printing by a printing system, the method comprising:
   selecting a first set of data items relating to a first slice of the image to be printed;
   selecting a second set of data items relating to a second slice of the image to be printed;
   with a first print engine, processing said first set of data items and printing said first slice of the image; and
   with a second print engine, processing said second set of data items and printing said second slice of the image;
   wherein said first and second print engines operate in parallel to simultaneously print said first and second slices of the image on a print medium which passes the print engines in a print medium advance direction and said slices share a boundary lying parallel to a print medium advance direction and wherein each engine processes data items sequentially within each slice along columns lying parallel to the print medium advance direction,
   wherein processing of at least one data item of the first set of data items depends on one or more data items of the second set of data items, and processing of at least one data item of the second set of data items depends on one or more data items of the first set of data items, such that the first data set of data items is mutually exclusive with the second data set of data items in that no data item of the first data set is part of the second data set and in that no data item of the second data set is part of the first data set.

2. A method as claimed in claim 1, wherein steps selecting a first set of data items relating to a first slice of the image to be printed and selecting a second set of data items relating to a second slice of the image to be printed each comprise:
   determining for the slice of the image to be selected a set of positional identifiers distinguishing the items of input data relating to that portion.

3. A method as claimed in claim 1, further comprising:
   selecting one or more additional set(s) of data items relating to one or more additional slice(s) of the image to be printed;
   with one or more additional print engine(s), processing said additional set(s) of data items and printing said additional slice(s) of the image;
   wherein all of the print engines operate in parallel to simultaneously print said slices of the image on a print medium and wherein the number of print engines is equal to the number of image slices forming the complete image to be printed.

4. A method as claimed in claim 1, wherein each print engine comprises:
   a) a halftoning processor to operate on image data in a slice to be processed and to generate halftone data therefrom, and
   b) a print element controller for receiving halftone data from the halftoning processor and generating print element control instructions therefrom for communication to a set of print elements.

5. A method as claimed in claim 1, wherein:
   said first and second sets of data items are selected from rasterized data, said rasterized data represents an image of a page, said first and second sets of data each represent only a slice of said image having a width less than the width of the full image of the page and having a lateral boundary lying along a print medium advance direction, and processing said first and second sets of data items results in generation of halftone data, and said processing is performed by sequentially processing data elements representing columns of image elements lying along the print medium advance direction.

6. A method as claimed in claim 5, wherein said rasterized data comprises a plurality of data items each having one or more positional identifiers associating the data item with a position in the represented image, and wherein said first and second sets of data items are selected by determining a set of positional identifiers corresponding to a slice of the image, and then selecting from the rasterized data those data items having positional identifiers in the determined set.

7. A method as claimed in claim 5, wherein said data items represent pixels in an image having a length and a width, and the positional identifiers are effective to identify the position of the pixel in the image, and wherein said first and second sets of data items are selected by determining the positional identifiers of the set of pixels lying in a specified range of positions along the width of the image.

* * * * *